Oct. 5, 1965  L. M. YOCK  3,209,886
VENEER DRYER UNLOADER
Filed Dec. 8, 1961  4 Sheets-Sheet 1

INVENTOR
LEWIS M. YOCK
BY
Williams, David, Hoffmann & Yount
ATTORNEYS

INVENTOR.
LEWIS M. YOCK
BY
Williams, David, Hoffmann & Yount
ATTORNEYS

United States Patent Office 3,209,886
Patented Oct. 5, 1965

3,209,886
VENEER DRYER UNLOADER
Lewis M. Yock, Sherwood, Oreg., assignor to The Coe Manufacturing Company, Painesville, Ohio, a corporation of Ohio
Filed Dec. 8, 1961, Ser. No. 158,070
9 Claims. (Cl. 198—20)

The present invention relates to the handling of material in sheet form and more particularly to the handling of sheets of veneer including the arranging of such sheets into a single layer as they are discharged from apparatus comprising a plurality of superimposed conveyors, such as a multiple deck dryer, and, if desired, changing their direction of travel.

One of the objects of the invention is the provision of a novel and improved apparatus for receiving lengths of sheet material, and, more particularly, veneer, as they are discharged or delivered from an aparatus comprising a plurality of superimposed conveyors such as a multiple deck dryer, the respective conveyor decks of which were loaded in such a manner that the leading ends of the sheets in the respective conveyors are staggered with respect to one another, and rearranging them into a single layer, and, if desired, changing their direction of travel.

Another object of the invention is the provision of a novel and improved method and apparatus for handling material in sheet form, and, particularly veneer, which apparatus includes a plurality of tiered or superimposed conveyors, for example, a multiple deck dryer, means adjacent to one end of the tiered conveyors for loading sheets into the conveyors with the leading ends of the sheets in the respective conveyors trailing one another, means adjacent to the other end of the tiered conveyors for receiving sheets discharged from the tiered conveyors and rearranging them in a single layer, and, if desired, changing their direction of travel.

The invention in certain construction and combinations and arrangements of parts and further advantages of the invention will be apparent to those skilled in the art to which it relates from the following description of the preferred embodiment described with reference to the accompanying drawings forming a part of this specification, in which similar reference characters designate corresponding parts, and in which.

Figure 1:
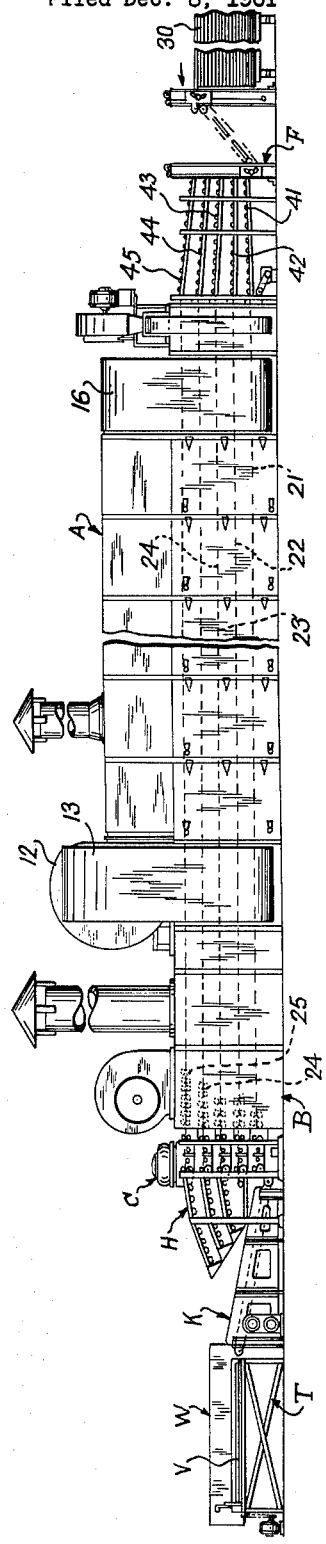
FIG. 1 is a side elevational view of apparatus for automatically handling and drying veneer embodying the present invention.
Figure 2:
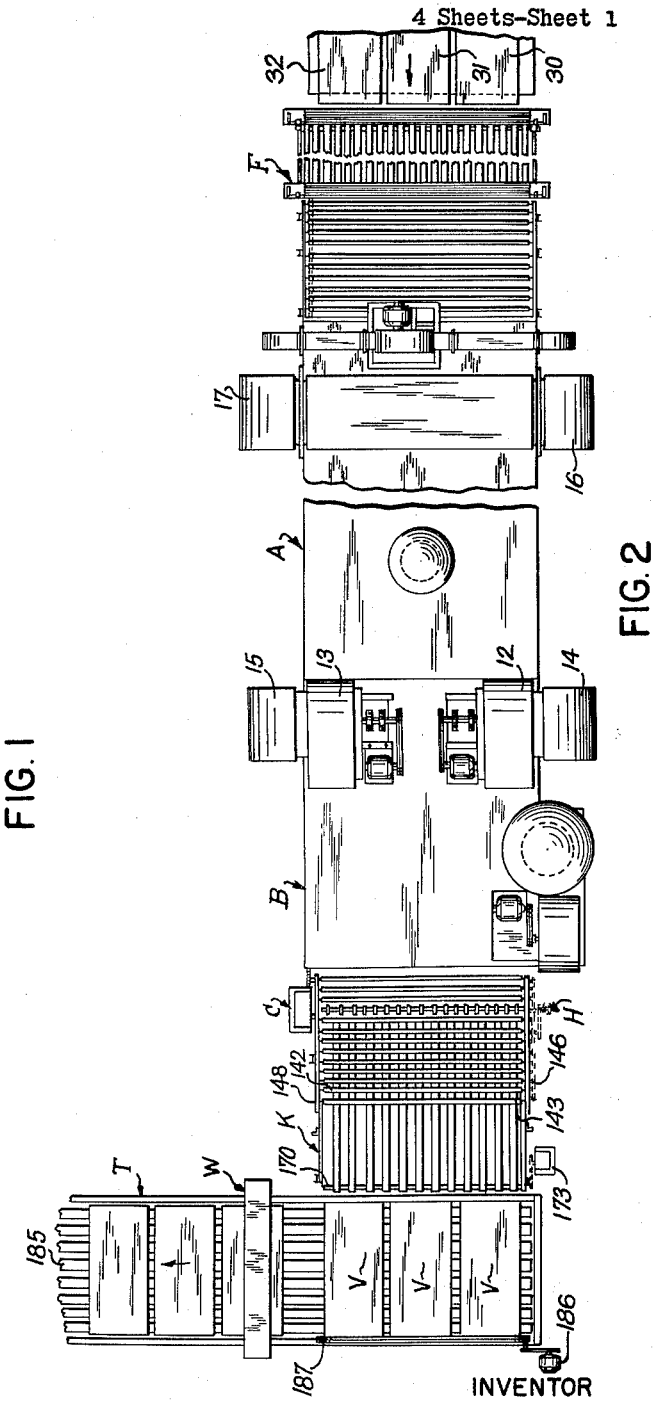
FIG. 2 is a plan view of the apparatus shown in FIG. 1.
Figure 3:
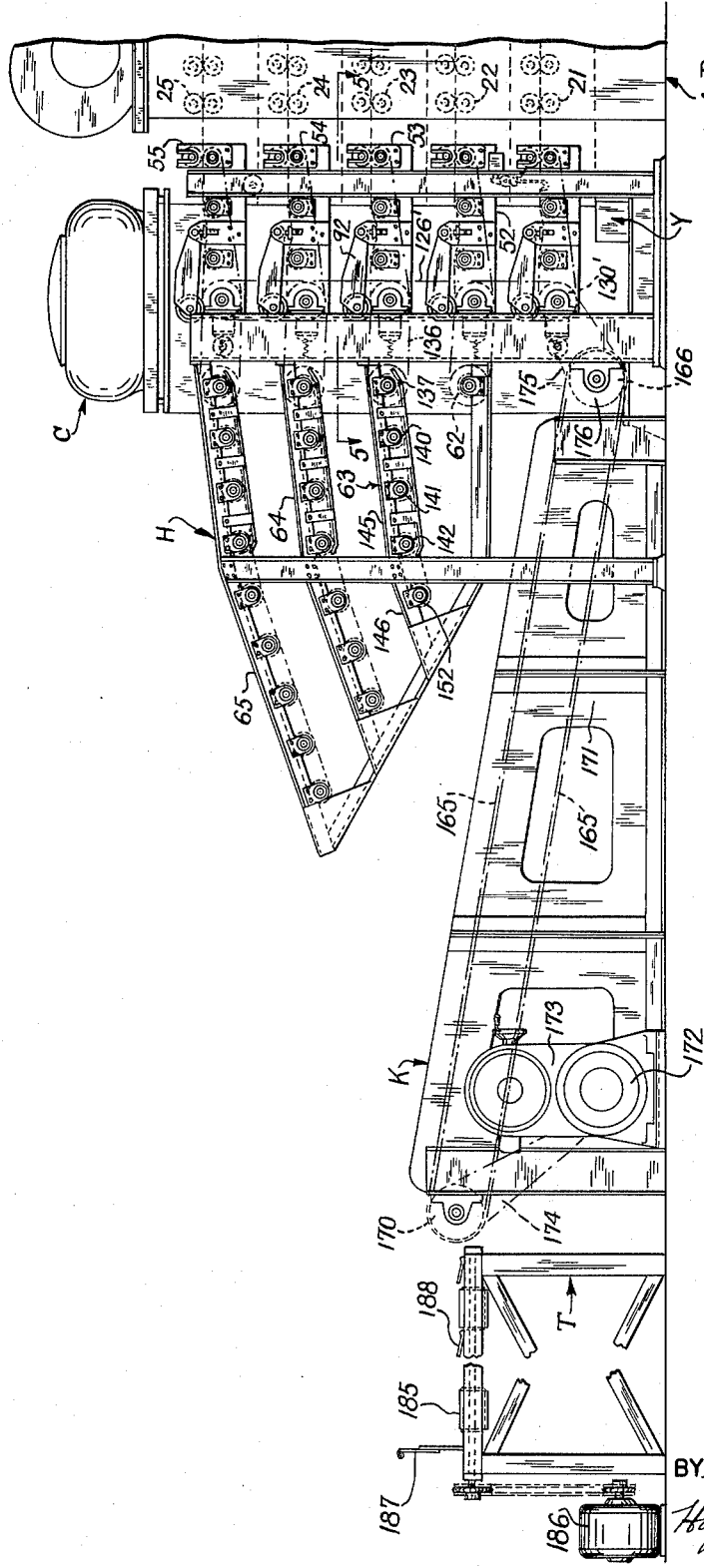
FIG. 3 is an enlarged fragmentary view of a portion of FIG. 1 showing the discharge end of the dryer and the apparatus adjacent thereto.
Figure 4:
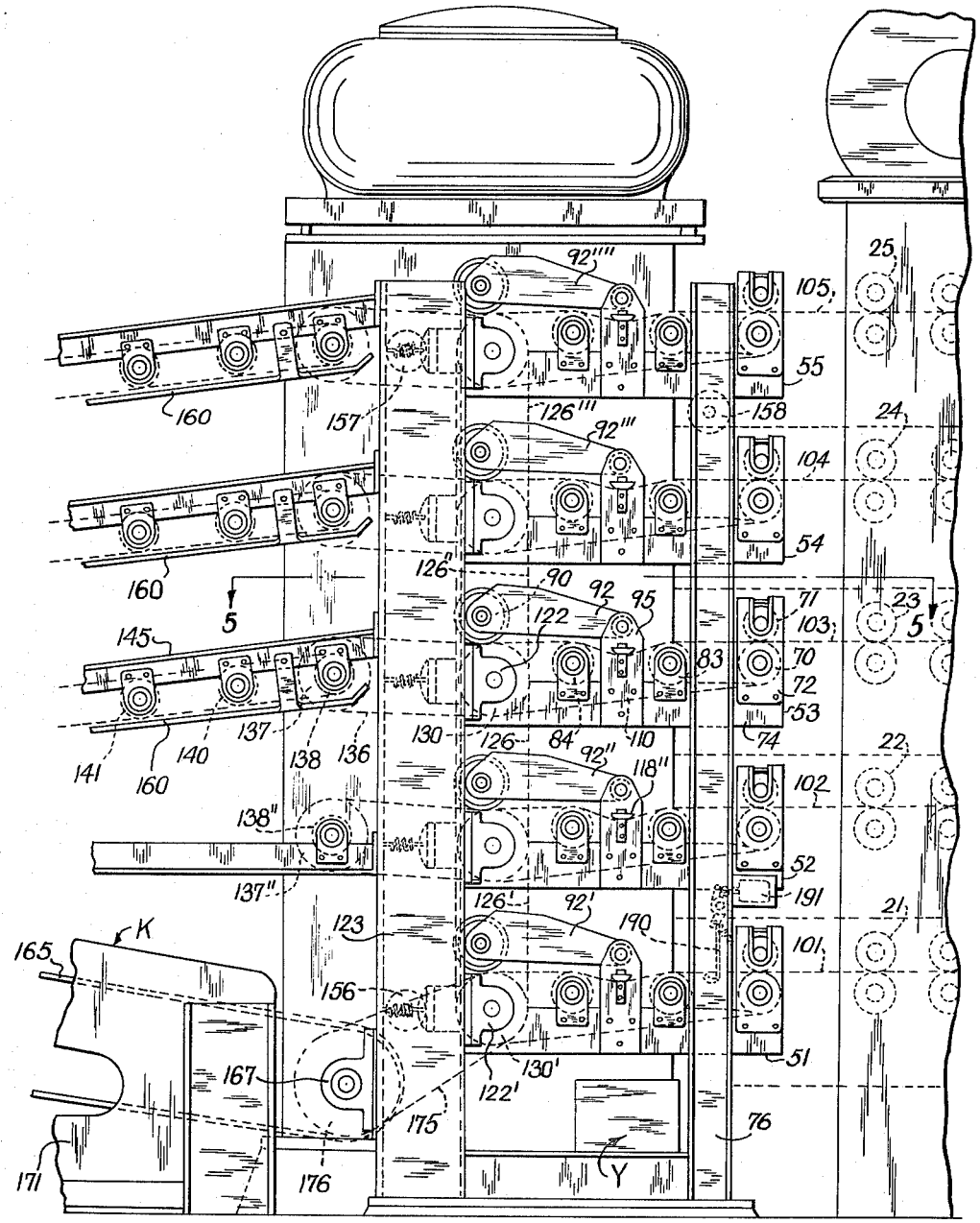
FIG. 4 is an enlarged fragmentary view of a portion of FIG. 3.

While the invention is susceptible of various modifications and alternate constructions, the present preferred embodiment is shown in the drawings and herein described in detail. It is to be understood, however, that there is no intention to thereby limit the invention to the specific apparatus disclosed, but it is the intention to cover all modifications and alternative constructions falling within the spirit and scope of the invention as expressed in the appended claims.

Referring to the drawings, the reference character A designates a veneer dryer. The exemplary dryer A shown is a commercially available gas fired five conveyor deck dryer somewhat similar to that shown in Morris, Patent No. 2,757,920, but any suitable dryer may be substituted for the dryer shown. The dryer comprises an elongated housing, generally rectangular in cross-sectional shape having a horizontal partition therein which divides the housing into a lower drying chamber and an upper recirculating fluid duct. The upper fluid duct provides means by which the fluid, preferably heated air, employed in the drying process, may be recirculated through the drying chamber with the air flowing through the drying chamber always in the same direction, which, in the dryer shown is from right to left as the dryer is viewed in the drawings. The air is circulated or recirculated by electric motor driven centrifugal fans within the fan housings 12, 13, the intakes of which are connected to the dry end of the drying chamber by suitable manifolds 14, 15. The exit end of the air duct is connected to the other or wet end of the drying chamber by somewhat similar manifolds 16, 17. The dryer A shown, includes a cooling section B at its dry end in which the veneer being dried is cooled. Cool air is circulated through the cooling section B of the dryer by an electric motor driven fan within the fan housing 18. The cooling sectinon B is generally similar to the dryer proper except for the omission of the recirculating air duct. The cooling section can be omitted, if desired.

During the passage of the air through the recirculating air duct it is heated and/or reheated by a gas burner located in the recirculating air duct.

The cooling chamber of the cooling section B of the dryer A is or may be considered an extension of the drying chamber of the dryer and the veneer is carried through both chambers by a plurality, in the present instance five, tiered or superimposed conveyors 21, 22, 23, 24, 25 extending through the aligned drying and cooling chambers. The conveyors which form the various decks of the dryer are driven at the same uniform speed by an adjustable speed drive rig or unit C of commercial construction in a well understood manner.

As veneer is peeled from a log it comes from the veneer lathe in more or less continuous webs which are customarily cut into sheets varying in width up to about four feet plus a couple of inches allowed for trimming. Such sheets usually range in length from four to sixteen feet plus trim in steps of two feet. Commercial veneer dryers are usually about fourteen feet wide. For purposes of illustration it will be assumed that the dryer A is fourteen feet wide and that the veneer being dried is four feet wide and ten feet long plus a few inches of trim.

Three sheets of veneer, hereinafter sometimes referred to as a load or charge, are arranged side by side with their leading ends aligned and simultaneously fed into the wet end of the respective decks of the dryer A in sequence and at predetermined intervals. The successive loads fed to any one deck or conveyor of the dryer are fed in such a manner that the leading edges of any one load abut or substantially abut the trailing edges of the veneer forming the load immediately in front. The decks are loaded sequentially in such a manner that the leading edges of the veneer forming successively fed loads trail one another. Assuming that the sequence for feeding the decks of the dryer A is from bottom to top and that the decks are traveling at a speed of ten feet per minute, a load of veneer is fed to the dryer approximately every twelve seconds and the leading edges of the successively fed loads trail one another by about two feet. That is, any load immediately above another load will be moving through the dryer about two feet behind the load immediately below it.

The veneer may be fed into the wet end of the dryer in any suitable manner. In the embodiment shown, sheets of veneer, designated V, are fed to the dryer from three stacks, 30, 31, 32 of veneer aligned with the infeed end of a mechanical feeding apparatus F positioned at the wet or infeed end of the dryer. The apparatus F, illustrated, is similar to that shown in United States patent to Parker, No. 2,649,182 and includes a tipple unit or assembly and a multiple deck conveyor section. Periodically the operator standing behind the stacks of veneer pushes the leading ends of the top sheets of the stacks forwardly a small distance and into the infeed end of the tipple unit of the feeding apparatus F. At the correct time the load thus formed is automatically fed or transferred by the tipple unit to the proper deck of the conveyor section and in turn to the proper deck of the dryer A. Like the dryer A the conveyor section of the feeding apparatus F has five tiered or superimposed driven conveyors 41, 42, 43, 44, 45. These conveyors are of the driven roll type, however, any suitable type may be employed. The discharge ends of the conveyors 41–45 are aligned with the conveyors 21, 24, respectively, of the dryer. The tipple unit is operated in timed relation to the speed of the conveyors of the dryer, and the conveyors 41–45 of the conveyor section are driven from and at the same speed as the decks of the dryer.

Figure 5:
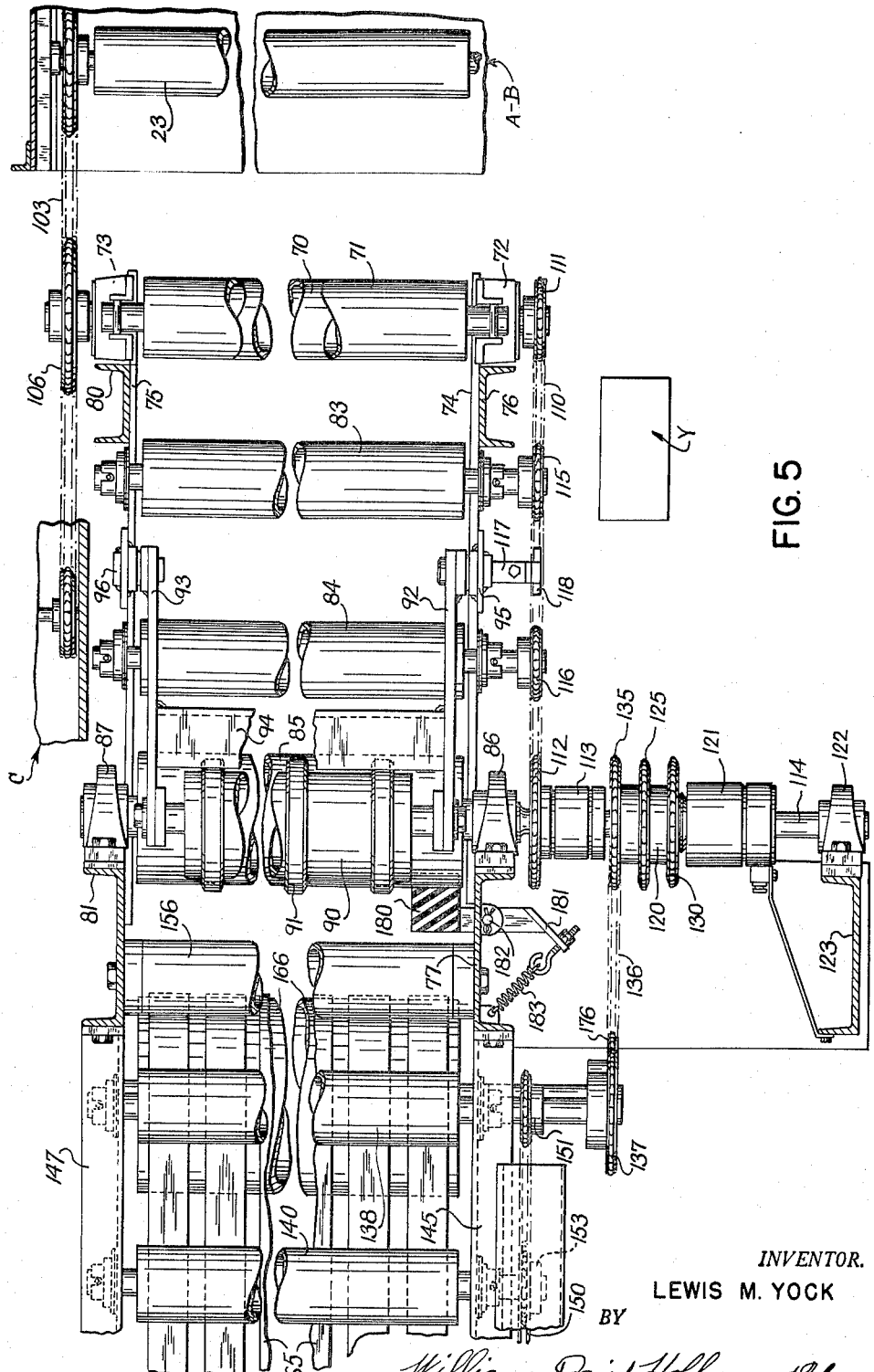
FIG. 5 is a fragmentary sectional view approximately on line 5—5 of FIGS. 3 and 4.

In view of the manner in which the veneer is fed into the dryer, it will be evident that loads of veneer will reach the dry or exit end of the dryer successively at intervals of about 12 seconds. As the forward end of the leading load in any deck of the dryer emerges from the exit end of the dryer it engages or is received in or on one of a plurality of tiered or superimposed conveyors of a discharge apparatus H located at the dry or discharge end of the dryer. The discharge apparatus H comprises a discharge unit comprising five tiered conveyors 51, 52, 53, 54, 55, the entrance end of which align with the exit ends of the dryer decks 21 to 25, respectively. With the exception of the bottom deck, the exit end of the conveyors or decks 51–55 of the discharge unit align with decks 62, 63, 64, 65 of an extended conveyor section forming a part of the discharge apparatus H. The decks 51–55 of the discharge assembly H are alike and merely the third deck from the bottom, which is the deck shown in FIG. 5, will be described in detail. The corresponding parts of the other decks will be designated by the same reference characters with prime, double prime, triple prime and quadruple prime marks affixed thereto to designate the first, second, fourth and fifth decks.

Referring specifically to the third deck of the main discharge unit or assembly of the discharge apparatus H, as the leading end of a load of veneer in the third deck 23 from the bottom of the dryer emerges from the exit end of the dryer it engages between a pair of superimposed rolls 70, 71, of the third from the bottom conveyor deck 53 of the main discharge unit of the discharge apparatus H. The rolls 70, 71 extend across the end of the dryer and have journal sections of reduced diameter at opposite ends by which they are rotatably supported in brackets 72, 73 at opposite sides of the discharge assembly. The brackets 72, 73 are detachably bolted to horizontal side members 74, 75 of the frame of the discharge apparatus H which members are welded to and extend between spaced upright channel members 76, 77 and 80, 81, respectively, at opposite sides of the frame. The bottom roll 70 is supported for rotation about a fixed axis while the journal extensions of the upper roll 71 project through vertically elongated slots in the brackets 72, 73 which permit movement of the upper roll 71 away from the lower roll 70 as veneer enters therebetween. The weight of the upper roll 71 tends to maintain it in engagement with the lower roll 70.

In addition to the pair of rolls 70, 71 the conveyor deck 53 includes a plurality of rolls 83, 84, similar to the roll 70, rotatably supported in suitable bearing brackets detachably bolted to the side frame members 74, 75 and a larger roll 85. The latter roll 85 is rotatably supported in bearing brackets 86, 87, detachably bolted to the side of the upright channel members 77, 81 facing the channel members 76, 80, respectively. The axis of rotation of the rolls 70, 83, 84 are aligned horizontally while the axis of rotation of the roll 85 is offset downwardly a slight amount so the tops of the rolls all align. The conveyor deck 53 further comprises a roll 90 similar to the rolls 70, 85 but of an intermediate size and having a plurality of longitudinally spaced annular rubber tread or friction members 91 secured thereto. The journal extensions of the roll 90 are rotatably supported in the left-hand ends of side members 92, 93 of a pivoted frame 94. The right-hand ends of the members 92, 93 are pivotally connected to the upper end of bracket members 95, 96 welded to the side members 74, 75 intermediate the rolls 83, 84. The roll 90 normally rides upon the roll 85, but is free to move away from the roll 85 as veneer engages therebetween. In the embodiment shown the axis of rotation of the roll 90 is normally offset a slight distance in the direction in which veneer travels from the axis of the roll 85. The axis about which the side members 92, 93 pivot is substantially horizontal with the axis of rotation of the roll 90 when it is resting upon the roll 85. Any suitable arrangement, however, will suffice. It is also to be understood that, under some conditions, it may be desirable to space the pinch rolls 85, 90 further from the dryer. In this event, any number of rolls similar to the rolls 83, 84 may be employed.

The rolls of the conveyors which form the decks 21 to 25 of the dryer are driven from the drive unit or rig C by sprocket chains 101–105, respectively, and the far end of the roll 70, as viewed in the drawings, is provided with a sprocket wheel 106 keyed to the end of the reduced journal section thereof which sprocket wheel is engaged and driven by the upper reach of a sprocket chain 103 extending between the drive rig and the third deck of the dryer.

The upper or hold-down roll 71 is not driven. The rolls 83, 84 and under normal conditions, the roll 85 are driven from the near end of the roll 70 by a sprocket chain 110 encircling suitable sprocket wheels 111, 112 keyed to the near journal extensions of the roll 70 and to a driving element of an overdriving or overrunning clutch 113 which driving element is rotatably supported on an extension 114 of the journal section of the roll 85 while the driven element of the clutch is keyed to the extension 114. The upper reach of the sprocket chain 110 engages the upper parts of sprocket wheels 115, 116, keyed to the near journal extensions of the rolls 83, 84. A projection 117 on the bracket 95 carries a member 118 under which the upper reach of the sprocket chain 110 passes and which maintains the chain in engagement with the sprocket wheels 115, 116 on the rolls 83, 84.

The roll 85 is normally driven by the sprocket chain 110 through the clutch 113 but, as will be hereinafter described, at predetermined intervals, it is driven at a higher speed from a sprocket wheel cluster 120 adapted to be operatively connected with and disconnected from the journal extension 114 of the roll 85 by suitable clutch means, for example, a magnetic clutch 121. The outboard or overhanging end of the extension 114 is supported in a bearing bracket 122 connected to the side of a channel-shaped upright member 123 of the frame of the discharge apparatus H.

The sprocket wheel cluster 120 includes a sprocket wheel 125 driven by a sprocket chain 126 from the corresponding sprocket wheel 125″ of the cluster immediately therebelow, that is, the corresponding cluster for the second deck 52 of the discharge apparatus A from the bottom. The sprocket cluster 120 also includes a sprocket wheel 130 connected by a sprocket chain 126″ to the corresponding sprocket wheel 130‴ of the cluster 120‴ of the deck 54 immediately above, and a sprocked wheel 135 connected by a sprocket chain 136 to a sprocket wheel 137 keyed to the journal section of a roll 138 extending across the apparatus and forming a part of the third deck from the top of the extended conveyor section of the discharge apparatus H. The roll 138 and the other rolls of the same deck of the conveyor section, of which there are a plurality designated 140, 141, 142, 143 are rotatably supported in suitable bearing brackets detachably bolted to the downwardly extending flanges of angle irons 145, 146 on the near side of the apparatus and similar angle irons 147, 148 on the far side of the apparatus. The angle irons referred to are fixed to the upright members 77, 81, previously referred to, and to other suitable parts of the frame of the discharge apparatus H and are inclined downwardly from right to left to guide veneer traveling upon being conveyed by the rolls 138, 140, 141, etc. towards a discharge conveyor K. The rolls 140, 141, 142, 143 are driven from the roll 138 by a sprocket chain 150 encircling sprocket wheels 151, 152 on the end rolls 138, 143 and having its upper reach in engagement with similar sprocket wheels fixed to the ends of the journal extensions of the rolls 140, 141, 142.

In the preferred embodiment shown, the frame of the discharge apparatus includes transversely extending tubular-like members 156, 157, 158, the members 156, 157 of which are fixed between the uprights 77, 81. The bottom member 156 is so positioned that it forms a guide for veneer moving from the roll 85' to the conveyor K. Deflector plates 160, 160', 160'' connected to the angle members 145, 146 of the third, fourth and fifth decks deflect downwardly, if necessary, any deformed veneer, etc., traveling on the deck therebelow. While an extended conveyor section of specific construction is illustrated, it is to be understood that the number of decks and the length of the respective decks may be varied to suit different situations.

The conveyor K comprises a plurality of belts 165, encircling a roll 166 extending across the apparatus and journaled in bearing brackets 167 bolted to the side of the uprights 77, 81 opposite to the bearing brackets which support the rolls 85, 85', etc., and a similar roll 170 at the opposite end of a frame of the discharge conveyor K, designated generally by the reference character 171, and which frame may be a part of the frame of the discharge apparatus H comprising the members 77, 81 but which is preferably made separate from the frame of the discharge apparatus H to facilitate manufacture and handling, etc. Roll 170 is driven from an electric motor 172, preferably but not necessarily, through a variable speed drive 173. The drive 173 is connected to the roll 170 by a sprocket chain 174 encircling sprocket wheels on the near journal section of the roll 170 and the driving shaft of the transmission 173, respectively.

The sprocket wheel cluster 120' of the lower deck 51 of the discharge apparatus H is driven from the roll 166 by a sprocket chain 175 encircling a sprocket wheel 176 on the near journal extension of the roll 166 and the sprocket wheel 135' of the lower deck. This sprocket wheel 135' is available for this purpose since in the embodiment shown there are no driven rolls between the discharge end of the conveyor 51 and the conveyor K. If preferred, the sprocket wheel 125', which is not used in the embodiment shown, could be connected to the sprocket wheel on the roll 166.

As mentioned above, the left-hand end of the bottom conveyor 51 discharges directly upon the near or right-hand end of the belts 165 of the conveyor K and the end of the conveyor K adjacent to the conveyor 51 is below the level of the conveyor and positioned closely adjacent thereto. The space therebetween, however, is occupied by the member 156 fixedly supported in the frame of the discharge apparatus H.

Insofar as the third conveyor deck 53 of the discharge assembly H has been described, the other conveyor decks are similar to it in construction and operation and, as previously stated, are not described in detail, but the corresponding part, thereof, are designated by the same reference characters with prime, double prime, triple prime and quadruple prime marks affixed thereto, to designate the first, second, fourth and fifth conveyor decks, respectively.

Each sprocket wheel cluster of the various decks corresponding with the cluster 120, with the exception of the cluster 120' of the bottom deck 51, are driven from the sprocket wheel cluster immediately below. For example, the sprocket wheel cluster 120'' is driven from the sprocket wheel 130' of the cluster 120' by a sprocket chain 126' similar to the chain 126, encircling the sprocket wheel 130' and the sprocket wheel 130'' immediately above. In a similar manner the sprocket wheel cluster 120''' is driven from the sprocket wheel 130 by the sprocket chain 126'' encircling the sprocket wheels 130, 130''' and the sprocket wheel cluster 120'''' by a sprocket chain 126''' encircling the sprocket wheels 125''', 125''''.

Like the conveyors 51, 53, the conveyors 52, 54, 55 of the main discharge assembly or unit of the discharge apparatus H discharge onto the conveyor belts 165, which, as previously stated, are inclined upwardly at a slight inclination and the veneer is supported in its travel from the conveyor 52 to the belts 165 by a supplemental conveyor section. In this instance the supplemental conveyor section comprises a single roll 138''. The two top supplemental conveyors, however, comprise a plurality of rolls, similar to supplemental conveyor associated with conveyor 53 but are of progressively increasing length and comprising more rolls. In the embodiment shown the second from the top supplemental conveyor comprises seven driven rolls and the top supplemental conveyor nine.

Each of the rolls 85, 85', etc., of the main discharge unit of the discharge apparatus H of conveyor 53 is provided with a discrete drag so as to quickly reduce its speed of rotation when the high speed drive, previously mentioned, is disconnected, which drag is in the form of a brake shoe 180, preferably made of friction-like material and connected to the free end of a member 181 pivoted intermediate its ends about a vertical pin 182 connected to the upright 77 of the frame of the discharge apparatus H. The other end of the member 181, that is, the near end, as the apparatus is viewed in the drawings, carries an eye bolt connected to one end of the spring 183. The opposite end of the spring 183 is connected to a bracket welded to the upright 77. The tension of the spring is adjustable and maintains a bias upon the brake shoe 180 tending to maintain the same in frictional contact with the near end of the roll 85.

The exit end of the belts 165 discharge onto a conveyor T which, in the embodiment of the invention shown, comprises a plurality of belts 185 extending transversely with respect to the belts 165 of conveyor K and driven by an electric motor 186. The conveyor T is as wide as the sheets of veneer being handled are long and as the sheets are delivered thereto by conveyor K they are stopped and aligned by a stationary vertical member 187 adjacent to the left-hand side of the belts 185, as viewed in the drawings. The conveyor T changes the direction of travel of the sheets of veneer and carries them to other apparatus for further processing. In order to prevent the leading edges of the veneer transferred from conveyor K to the belts 185 from striking the sides of the belts, suitable resilient guides 188 are provided intermediate the adjacent right-hand sides of the belts 185. The reference character W designates a moisture detector of commercial construction.

As the leading end of a load of veneer leaving the lower deck of the dryer emerges from the rolls 70', 71' of the deck 51 of the discharge apparatus H, it contacts or engages the downwardly projecting operating arm 190 for a normally open limit switch 191. The downwardly projecting arm 190 for the limit switch 191 is pivoted near its upper end for oscillation about a horizontal axis upon a pin suitably supported in the frame of the main discharge assembly H and when the lower projecting end is engaged by the leading edge of veneer it is oscillated about its pivot in a manner to close normally open contacts of the limit switch. The closing of this limit switch resets a recycling timer Y which may be of any commercial construction, for example, the "Staley" recycling sequence timer, Model 635, manufactured and sold by Electric Switch Corporation, 2320 S. Tibbs Avenue, Indianapolis, Indiana. The veneer continues to travel through the lower conveyor deck 51 passing over the driven rolls 83', 84' thereof and between the main discharge rolls 85', 90' at dryer speed for a predetermined interval determined by the setting of the sequence timer. After the predetermined time, which is adjustable, the magnetic clutch 121' is energized for a predetermined period which period is also adjustable and the discharge rolls 85'', 90' driven therethrough at high speed. The driving of these rolls at high speed discharges the load of veneer therebetween onto the discharge belts 165 which are also traveling at a high speed. From the belts 165, the load of veneer is discharged onto the belts 185 of conveyor T which belts are also traveling at a relatively high speed.

While a load of veneer in the lower deck 51 of the discharge apparatus H is being discharged onto conveyor T, the leading load of veneer in the second deck 52 is moving through the discharge apparatus and into position between the discharge rolls 85'', 90'' thereof. After elapse of a second predetermined interval, the clutch 121'' of deck 52 is energized by the sequence timer and the load of veneer engaged between the discharge rolls 85'', 90'' discharge upon the belts 165 and by the belts 165 onto the belts 185 of conveyor T. The relative speeds of the discharge rolls 85, 90, the belts 165 and the belts 185 are such that as a succeeding load of veneer is discharged onto the belts 185 the load of veneer previously fed thereto has been moved ahead clear or beyond the end of conveyor K with the result that the successive loads of veneer is fed to conveyor T so that the veneer thereon travels therealong in tandem.

The decks 53, 54, 55 are discharged onto the discharge belts 165 of conveyor K and from the belts 165 to the belts 185 of conveyor T in a similar manner to decks 51, 52 by subsequent operations of the sequence timer. At or about the time the upper deck is being discharged onto conveyor T, depending upon the length of the sheets of the veneer being fed, the speed of the various conveyors, etc., the recycling sequence timer Y is again reset by engagement of the leading end of the following load of veneer in the lower deck of the dryer. Assuming, as previously stated, that a load of veneer reaches the exit end of the dryer every twelve seconds and that the length of the sheets of veneer being fed is about ten feet, a load of veneer must be advanced by the main discharge rolls 85, 90, etc., of the discharge or unloading apparatus H to conveyor T and moved by the latter beyond the discharge end of conveyor K while a load of veneer in the dryer is moving approximately two feet. In other words, the speed of conveyor K must be approximately five times that of the speed of the dryer conveyors and the speed of conveyor T must be approximately eight times that of the speed of the dryer conveyors.

While in the preferred embodiment of the invention described, the decks of the dryer are unloaded in a sequence beginning with the bottom deck, it will be understood that the sequence may begin with any deck and that the recycling sequence timer or controller may be reset by veneer emerging from any deck of the dryer. The purpose for resetting the timer is to provide for variations and irregularities in the positions of loads of veneer in the decks of the dryer. If desired, the recycling sequence timer can be eliminated and the high speed operation of the discharge rolls of the various decks of the unloading or discharge apparatus controlled by the actuation of discrete limit switches by loads of veneer emerging from the various decks of the dryer. It will be obvious that any suitable means may be employed to time the various operations. Such control may be driven from some moving part of the apparatus, if desired.

From the foregoing description of the preferred embodiment of the invention, it will be apparent that the objects heretofore enumerated and others have been accomplished and that there has been provided a novel and improved apparatus for handling sheet material and more particularly veneer discharged from a multiple deck dryer and arranging the sheets of veneer in a single layer upon a conveyor with or without changing their direction of travel. If it is not necessary or desirable to change the direction of travel of the material, it is obvious that the discharge conveyor K may discharge upon a conveyor traveling in the same direction as the conveyor K is traveling and at a suitable speed.

As a further alternative construction, the conveyors of the extended conveyor section of the unloading or discharge apparatus H may all be of substantially the same length and discharge directly onto a conveyor such as the conveyor T traveling at right angles to the direction in which the veneer travels through the dryer, etc. In this event the discharge ends of the conveyors would preferably be converged as much as possible. In other words, the conveyor K may be omitted by modifying the extended conveyor section of the unloading apparatus.

While the preferred embodiment of the invention has been described in considerable detail, as previously mentioned, the invention is not limited to the particular apparatus shown and it is the intention to hereby cover all adaptations, modifications and uses thereof which come within the spirit and scope of the appended claims.

Having thus described my invention, what I claim is:

1. In equipment for handling material in sheet form, a plurality of tiered first conveyors, first means for driving said first conveyors, second means adjacent to one end of said first conveyors for loading sheets into said first conveyors sequentially with the sheets loaded in the respective first conveyors during any sequential loading cycle overlapping and their leading ends trailing one another, a plurality of tiered second conveyors adjacent to the other end of said first conveyors for receiving sheets discharged from said first conveyors, third means for driving said second conveyors at speeds not less than the speed of said first conveyors times the number thereof, fourth means actuated by the engagement therewith of the leading edge of sheets discharged by said first conveyors for actuating said third means to drive said second conveyors sequentially, a third conveyor adjacent to the discharge ends of said second conveyors, said third conveyor extending in a direction at right angles to the direction of travel of said second conveyors, and fifth means for driving said third conveyor at a speed such that it travels a distance equal to the width of said second conveyors while said second conveyors are moving a distance approximately equal to the length of the sheets being handled.

2. In equipment for handling material in sheet form, a plurality of tiered first conveyors, first means for driving said first conveyors, second means adjacent to one end of said first conveyors for loading sheets into said first conveyors sequentially with the sheets loaded in the respective first conveyors during any sequential loading cycle overlapping and their leading ends trailing one another, a plurality of tiered second conveyors adjacent to the other end of said first conveyors for receiving sheets discharged from said first conveyors, third means for driving said second conveyors at speeds not less than the speed of said first conveyors times the number thereof, fourth means actuated by the engagement therewith of the leading edge of sheets discharged by said first conveyors for actuating said second means to drive said second conveyors sequentially at a speed approximately equal to the speeds of said first conveyors multiplied by the number of said first conveyors, a third conveyor adjacent to the discharge end of said second conveyors, a fourth conveyor adjacent to the discharge end of said third conveyor and extending in a direction at right angles to the direction of travel of said third conveyor, and fifth means for driving said fourth conveyor at a speed such that it travels a distance equal to the width of said third conveyor while said first conveyors are moving a distance approximately equal to the length of the sheets being handled.

3. In apparatus for handling veneer in sheet form, a dryer having a plurality of tiered first conveyors, first means for driving said first conveyors at a predetermined speed, second means adjacent to one end of said dryer for loading sheets of veneer into said first conveyors sequentially with the sheets of veneer loaded in the respective first conveyors during any sequential loading cycle overlapping and their leading ends trailing one another, a plurality of tiered pinch roll type conveyor mechanisms adjacent to the discharge end of said dryer for receiving sheets of veneer discharged from said first conveyors, third means for driving said pinch roll type conveyor mechanisms at a speed not less than the speed of said first conveyors multiplied by the number of said first conveyors, fourth means actuated by the engagement therewith of the leading edge of veneer discharged by said first conveyors for actuating said second means to drive said pinch roll type conveyor mechanisms sequentially in timed relation, a third conveyor located adjacent to the discharge end of said pinch roll type conveyor mechanisms and extending in a direction at right angles to the direction of travel of said pinch roll type conveyor mechanisms, and fifth means for driving said third conveyor at a speed such that it travels a distance equal to the width of said pinch roll type conveyor mechanism while said first conveyors are moving a distance approximately equal to the length of the sheets of veneer being handled divided by the number of said first conveyors.

4. In apparatus for handling material in sheet form as it is discharged from a multiple deck dryer, a plurality of pinch roll type first conveyors positioned at different levels adapted to receive sheets as they are discharged from different decks of the multiple deck dryer, first means for selectively driving said first conveyors to move sheets thereon at a speed not less than the speed of sheets on the dryer multiplied by the number of decks thereof, second means for engaging said drive means sequentially in predetermined timed relation, and a second conveyor underneath said first conveyors and onto which said first conveyors discharge.

5. In apparatus for handling material in sheet form as it is discharged from a multiple conveyor deck dryer, a plurality of pinch roll type first conveyors positioned at different levels adapted to receive sheets as they are discharged from different decks of the multiple deck dryer, first means for selectively driving said first conveyors at a speed not less than the speed of the dryer conveyors multiplied by the number of decks thereof, second means for engaging said drive means sequentially in predetermined timed relation, a second conveyor adjacent to the discharge ends of said first conveyors and onto which said first conveyors discharge, a third conveyor located adjacent to the discharge end of said second conveyor and extending in a direction at right angles to the direction of travel of said second conveyor, and third means for driving said third conveyor at a speed such that it travels a distance equal to the width of said second conveyor while the conveyors of the dryer are moving a distance approximately equal to the length of the sheets being handled divided by the number of first conveyors.

6. In apparatus for handling material in sheet form as it is discharged from a multiple conveyor deck dryer, a plurality of pinch roll type first conveyors positioned at different levels adapted to receive sheets as they are discharged from different decks of the multiple deck dryer, first means for driving said first conveyors at approximately the speed of the dryer decks, second means for selectively driving said first conveyors at a speed not less than the speed of the dryer conveyors multiplied by the number of decks thereof, second means actuated by the engagement therewith of the leading edge of sheets discharged by the dryer for engaging said drive means sequentially in predetermined timed relation, a second conveyor adjacent to the discharge ends of said first conveyors and onto which said first conveyors discharge, a third conveyor located adjacent to the discharge end of said second conveyor and extending in a direction at right angles to the direction of travel of said second conveyor, and third means for driving said third conveyor at a speed such that it travels a distance equal to the width of said second conveyor while the conveyors of the dryer are moving a distance approximately equal to the length of the sheets being handled divided by the number of first conveyors.

7. In apparatus for handling material in sheet form as it is discharged from a multiple deck dryer, a plurality of pinch roll type first conveyors positioned at different levels adapted to receive sheets as they are discharged from different decks of the multiple deck dryer, first means for selectively actuating said first conveyors to move sheets thereon at a speed not less than the speed of sheets on the dryer multiplied by the number of decks thereof, and a second conveyor underneath said first conveyors and onto which said first conveyors discharge.

8. In an apparatus having a plurality of tiered conveyor means operated at approximately the same speed providing a plurality of decks into which sheets, e.g. veneer, are loaded sequentially in such a manner that the sheets loaded during any loading cycle overlap with their leading ends trailing one another, mechanism for unloading the conveyor means and arranging the sheets in side-by-side tandem relation comprising: a plurality of tiered pinch roll-type conveyor means aligned respectively with the decks of the tiered conveyor means and adapted to receive sheets as they are discharged therefrom; first means for driving said pinch roll-type conveyor means to advance sheets at approximately the speed at which they are moved by the tiered conveyor means; second means for driving said pinch roll-type conveyor means to advance sheets at a speed not less than the speed of the tiered conveyor means multiplied by the number of decks; means including a cycle timer for actuating said second means to drive said tiered pinch roll-type conveyor means sequentially; means actuated by the engagement therewith of a leading edge of a sheet entering said mechanism for resetting said cycle timer; a single conveyor adjacent to the discharge end of said tiered pinch roll-type conveyor means extending in a direction at right angles to the direction of travel of sheets through said tiered pinch roll-type conveyor means, and third means for driving said single conveyor at a speed such that it travels a distance equal to the width of said pinch roll-type conveyor means while the first named tiered conveyor means are moving a distance approximately equal to the length of the sheets being handled divided by the number of decks.

9. In a veneer dryer having a plurality of tiered conveyor decks operated at approximately the same speed and into which decks sheets of veneer are loaded sequentially in such a manner that the sheets loaded during any loading cycle overlap with their leading ends trailing one another, an apparatus for unloading the dryer and arranging the sheets of veneer in side-by-side tandem relation comprising: a plurality of tiered pinch roll-type conveyor means aligned respectively with the discharge ends of tired conveyors of the dryer and adapted to receive sheets of veneer as they are discharged therefrom; first means for driving said pinch roll-type conveyor means at approximately the speed of the dryer conveyors; second means for selectively driving said pinch roll-type conveyor means at a speed not less than the speed of the dryer conveyors multiplied by the number of decks thereof; means including a cycle timer for actuating said second means to drive said pinch roll-type conveyor means sequentially; means actuated by the engagement therewith of a leading edge of a sheet of veneer entering one of said pinch roll-type conveyor means for resetting said cycle timer; a first single conveyor adjacent to the discharge end of said pinch roll-type conveyor means and onto which they discharge; third means for driving said first single conveyor at a speed not less than the speed of said dryer conveyors multipled by the number of decks; a second single conveyor adjacent to the discharge end of said first single conveyor and extending in a direction at right angles to the direction of travel of said first single conveyor; and fourth means for driving said second single conveyor at a speed such that it travels a distance not less than the width of said first single conveyor while the dryer conveyors are moving a distance approximately equal to the length of the veneer sheets being handled divided by the number of decks.

References Cited by the Examiner

UNITED STATES PATENTS

| | | | |
|---|---|---|---|
| 2,649,182 | 8/53 | Parker | 198—21 |
| 3,038,585 | 6/62 | Beckley | 198—20 |

FOREIGN PATENTS 546,991  3/32  Germany.

SAMUEL F. COLEMAN, *Primary Examiner.*

WILLIAM B. LA BORDE, ERNEST A. FALLER, JR., *Examiners.*